March 13, 1962 — W. F. REED — 3,024,765
AUTOMATIC FEEDING DEVICE FOR POULTRY
Filed Dec. 7, 1959 — 2 Sheets-Sheet 1
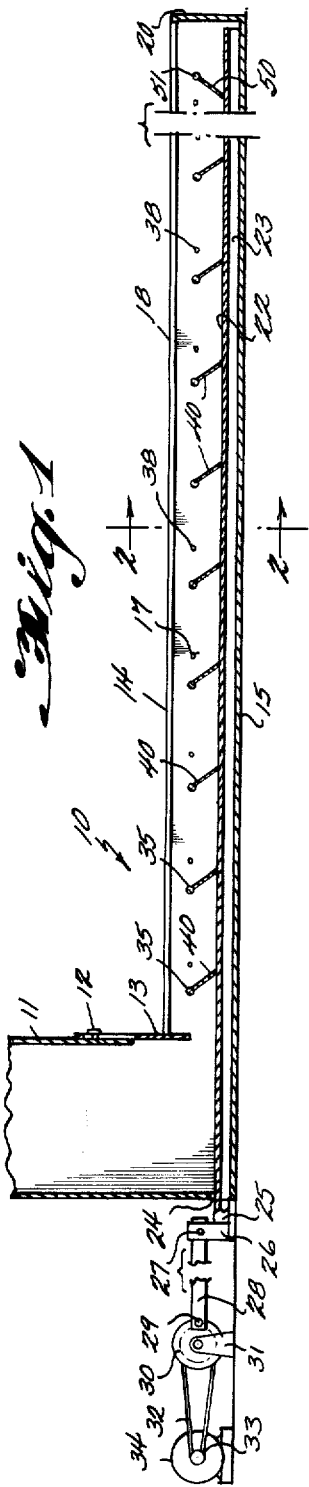
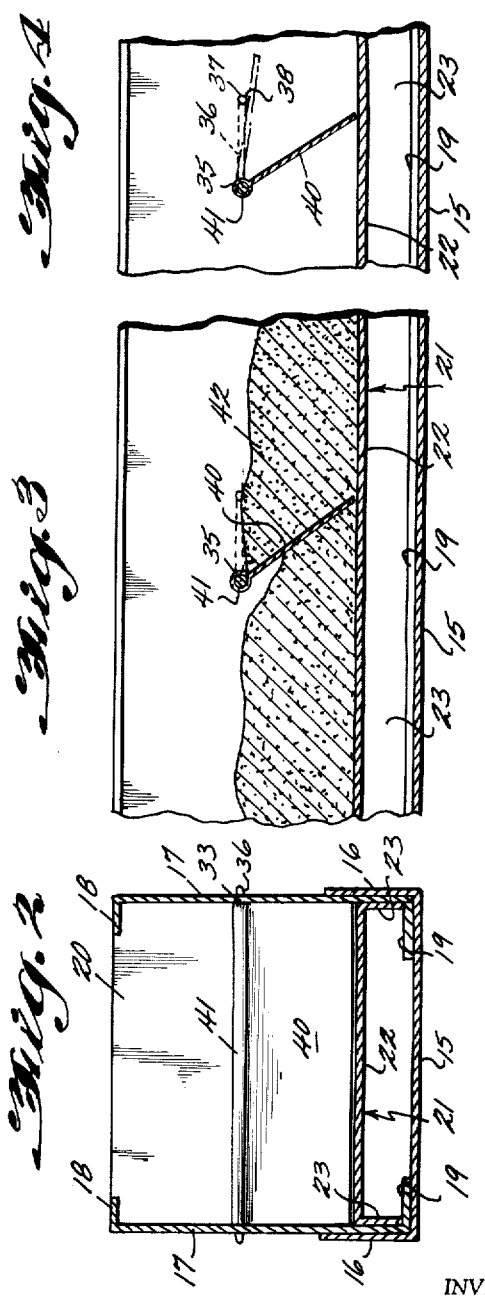
INVENTOR
WILLARD F. REED
BY
Kimmel & Crowell
ATTORNEYS

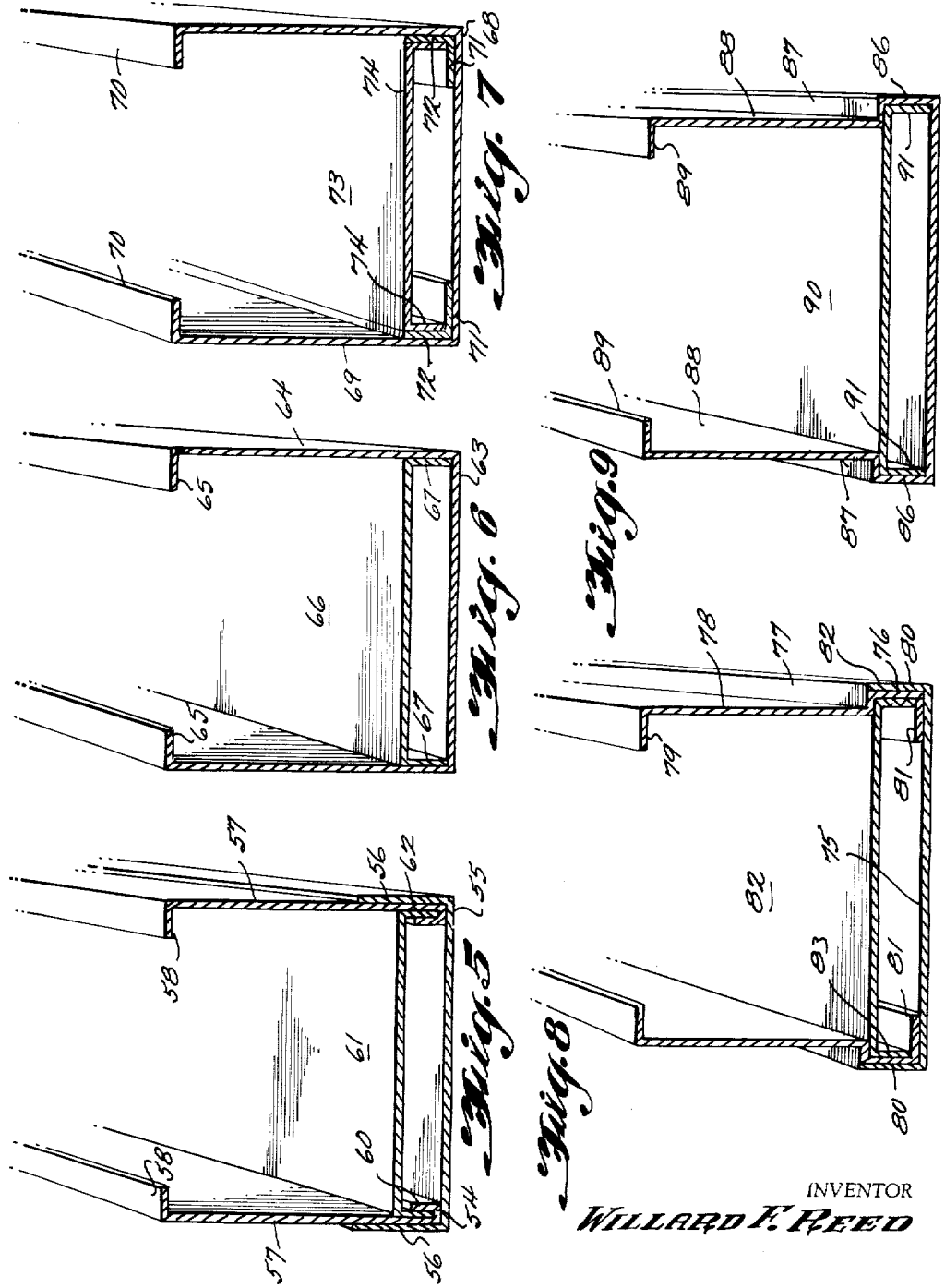

United States Patent Office 3,024,765
Patented Mar. 13, 1962

3,024,765
AUTOMATIC FEEDING DEVICE FOR POULTRY
Willard F. Reed, 1401 N. 12th St., Mount Vernon, Ill.
Filed Dec. 7, 1959, Ser. No. 857,730
1 Claim. (Cl. 119—52)

This invention relates to an automatic feeding device for poultry, and more particularly to such a device as employed in poultry houses for the feeding of large numbers of fowl.

A primary object of the invention is the provision of an automatic device which includes a reciprocating plate and baffle means for continuously feeding poultry feed into and along a trough until a predetermined point is reached, whereupon no more feed is supplied.

An additional object of the invention is the provision of a device of this character wherein the level of the feed in the trough may be maintained substantially constant.

Still another object of the invention is the provision of such an automatic feeding device which is sturdy and durable in construction, reliable and efficient in operation, and relatively simple and inexpensive to manufacture, utilize and assemble.

Other objects will in part be obvious and in part be pointed out as the description of the invention proceeds and shown in the accompanying drawings wherein:

FIGURE 1 is a longitudinal vertical sectional view through one form of automatic feeding device constructed in accordance with the instant invention;

FIGURE 2 is an enlarged sectional view taken substantially along the line 2—2 of FIGURE 1, as viewed in the direction indicated by the arrows;

FIGURE 3 is an enlarged detail sectional view taken on the longitudinal center line of the trough showing the positioning of the baffles in the trough when feed is supplied thereto;

FIGURE 4 is an enlarged fragmentary detail view, disclosing a constructional element of the baffle;

FIGURES 5, 6, 7, 8 and 9 are fragmentary perspective views showing different forms of troughs which may be employed in conjunction with the apparatus of the instant invention.

Similar reference characters refer to similar parts throughout the several views of the drawings.

Having reference now to the drawings in detail, and more particularly to the construction disclosed in FIGURES 1 to 4, there is generally indicated at 10 an automatic feeding device constructed in accordance with the instant invention.

The device comprises a feed hopper 11 of any desired conventional configuration, having an opening 12 in the front wall thereof, which is adapted to be opened or closed by a sliding door 13. The opening 12 communicates with an elongated feeding trough 14, which includes a bottom wall 15, and in the form shown in FIGURES 1 to 4, a pair of upstanding flanges 16 extending from the sides of the bottom wall 15. Side walls 17 extend upwardly on opposite sides of the bottom wall 15 and are provided at their upper extremities with inwardly turned flanges 18. The bottoms of side walls 17 are also inwardly turned, as at 19, to provide additional flanges resting on the bottom wall 15.

The end of the trough opposite feed hopper 11 is closed by a suitable plate 20. Positioned for reciprocatory movement on the bottom 15 is a slidable plate, generally indicated at 21, which includes a top wall 22 and side flanges 23, which rest on the flanges 19. The end of feed hopper 11 opposite opening 12 is provided with an elongated slot 24 adjacent its bottom through which the end 25 of the slide 21 extends. A fitting or bracket 26 is secured to the end 25, and has pivotally connected thereto, as by a pivot 27, an operating bar 28.

The operating bar 28 is connected at its opposite end to a crank pin 29 mounted on a rotatable disc 30, which is mounted in suitably spaced apart journals 31, and which is driven by a belt 32 from the drive shaft 33 of a conventional electric motor 34, or the like. It will be obvious that by virtue of this arrangement, the plate 21 is continuously reciprocated on the bottom 15 of the trough 14 as long as the motor 34 is energized. Obviously, the device may be actuated at any suitable speed.

Extending transversely across the trough 14 at suitably spaced intervals and at a suitable height above reciprocating plate 21 are a plurality of transversely extending baffle supporting wires 35. The ends of wires 35 extend through suitable openings in the side walls 17 and are bent at right angles, as indicated at 36, and thence extend inwardly through openings 37 in the side walls to form projections 38 which are in horizontal alignment with the transverse portion of the wires.

A plurality of baffle members 40, each having a reverted end portion 41, are mounted on baffle wires 35 and extend transversely across the trough 14. As best shown in FIGURES 1 and 3, these baffles are inclined in the direction away from the feed hopper 11 so as, in effect, to form one way check valves for feed 42 which is fed from the hopper 11 by the reciprocation of the plate 21. The projecting stops 38 serve to limit the movement of the baffles 40 in a direction away from the path of travel of the feed 42.

The end baffle 50 adjacent the closure member 20 is also pivotally mounted on a wire 51, but inclines in the opposite direction from the incline of baffles 40. This baffle thus serves as a stop, but is movable to permit excess feed piling against the end baffle 20 to escape back into the trough 14.

In the use and operation of the device obviously feed is fed forwardly beneath the baffles 40 which move out of the way to permit passage thereof, and on the return stroke of the plate the baffles move downwardly to the position as indicated in FIGURES 1 and 3, for example, to prevent the feed from moving backwardly toward the hopper 11. The device operates automatically, in that when the feed reaches a level as indicated in FIGURE 3 adjacent the top of the baffles, no more feed is admitted from the hopper, due to the width of the opening below the slidable door 13.

FIGURES 5 to 9 inclusive disclose various forms of troughs and sliding plates which may be employed in accordance with the instant invention. FIGURE 5, for example, discloses a bottom plate 55, having upwardly extending flanges 56, between which seats side walls 57 having top flanges 58. The side walls 57 at their lower ends are provided with horizontal flanges 59 having upturned extremities 60. A slidable plate 61 has downwardly turned flanges 62 which seat between the flanges 59 and the lower portions of side walls 57. The operation of this form of slide is identical to that of the preceding modification.

FIGURE 6 discloses a simplified form of construction wherein a bottom wall 63 has side walls 64 directly connected thereto, or integral therewith. Side walls 64 have inwardly turned top flanges 65, and a slidable plate 66 has downwardly turned side flanges 67 which seat directly on the bottom wall 63.

In further modification, as disclosed in FIGURE 7, the trough includes a bottom wall 68 having integral side walls 69 extending directly upwardly therefrom, the side walls 69 having inturned flanges 70. Channel shaped members are provided in the corners of this device and include horizontal flanges 71, and vertical flanges 72, the latter extending upwardly only to the level of the reciprocating plate 73. Plate 73 is provided with downwardly turned side flanges 74 which ride on the horizontal flanges 71, and in abutting relation with the vertical flanges 72.

A further modified form is shown in FIGURE 8, wherein the bottom wall 75 has upstanding side flanges 76 which are inturned as at 77, and thence extend upwardly to form side walls 78 having inturned top flanges 79. Channel irons are also provided in this modification having vertical flanges 80 which extend between the bottom 75 and the inturned portion 77, and horizontal inwardly extending flanges 81. The reciprocable plate 82 has downturned flanges 83 which ride on the horizontal flanges 81 in abutting relation with the vertical flanges 80.

Still another modification is shown in FIGURE 9, wherein the bottom plate 85 has upwardly extending portions 86, and inturned portions 87 from which extend the side walls 88 having inturned top flanges 89. In this modification the channel irons are omitted, and the reciprocating plate 90 has downwardly extending flanges 91 which ride directly on the bottom wall 85 in abutting relation with the upwardly extending portions 86.

In all of the above described modifications, the apparatus operates in a manner identical to that disclosed in connection with FIGURE 1.

Now from the foregoing it will be seen that there is herein provided an improved automatic feeding device for poultry, which accomplishes all of the objects of this invention, and others, including many advantages of great practical utility and commercial importance.

As many embodiments may be made of this inventive concept, and as many modifications may be made in the embodiments hereinbefore shown and set forth, it is to be understood that all matter herein is to be interpreted merely as illustrative and not in a limiting sense.

I claim:

An automatic feeding device for poultry comprising, in combination, an elongated trough, a feed hopper at one end of said trough, a reciprocable plate including downwardly extending side flanges in sliding contact with said trough and extending through said hopper, means reciprocating said plate disposed adjacent said hopper and including a pivotal bar secured to the end of said plate passing through said hopper, the opposite end of said reciprocable plate terminating adjacent the other end of said trough, said trough including spaced vertical side walls on each side of said reciprocable plate, baffle members pivotally secured within said trough to said side walls at a point intermediate the vertical dimension thereof, said baffle members having a dimension greater than the distance from the pivot center to the top of said reciprocable plate.

References Cited in the file of this patent

UNITED STATES PATENTS

| | | |
|---|---|---|
| 2,043,595 | Raymond | June 9, 1936 |
| 2,683,439 | Markey | July 13, 1954 |
| 2,785,792 | Cordis | Mar. 19, 1957 |
| 2,863,420 | Kofford | Dec. 9, 1958 |